Sept. 7, 1937.  L. L. RECTOR  2,092,261
TUBING HEAD FOR WELLS
Filed Dec. 14, 1935
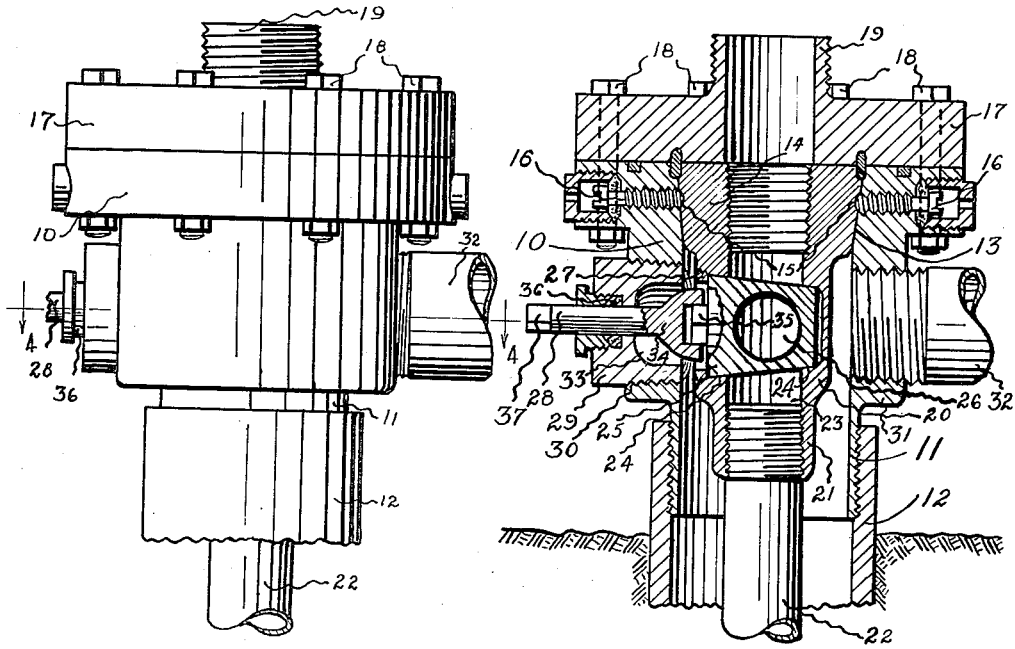
Fig. 1
Fig. 2
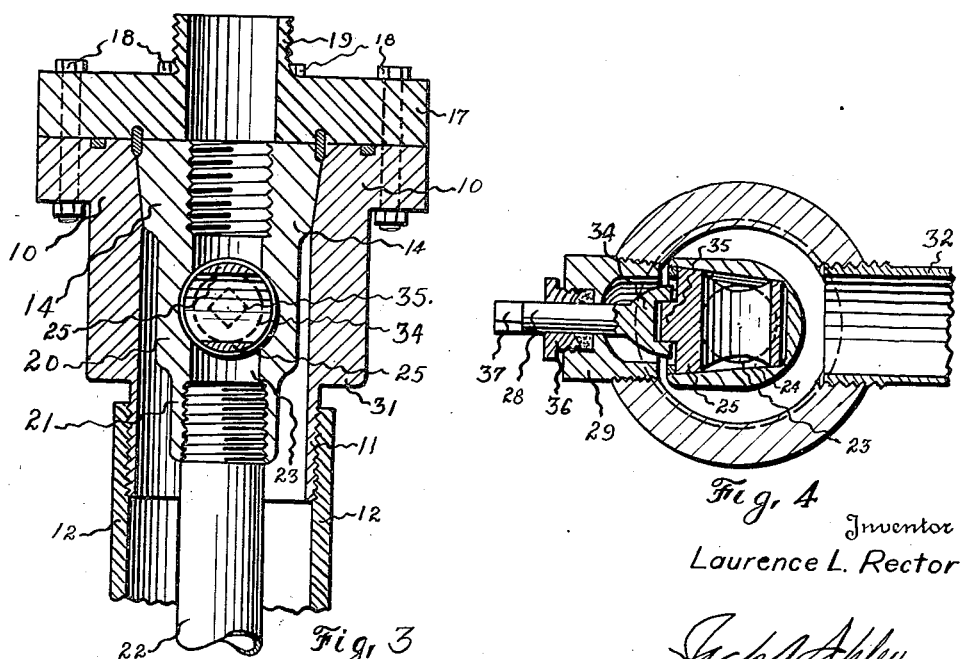
Fig. 3
Fig. 4
Inventor
Laurence L. Rector
By Jack A. Ashley
Attorney Patented Sept. 7, 1937

2,092,261

UNITED STATES PATENT OFFICE 2,092,261

TUBING HEAD FOR WELLS

Laurence L. Rector, Fort Worth, Tex.

Application December 14, 1935, Serial No. 54,356

8 Claims. (Cl. 166—15)

This invention relates to new and useful improvements in tubing heads for wells.

An object of the invention is to provide an improved well tubing head so arranged that the flow of fluid through the head may be cut off or regulated from the exterior of the head.

A particular object of the invention is to provide an improved tubing head including, a tubing hanger arranged to pack off the head; and a valve disposed in the head below the pack-off and having operating means accessible from the exterior of the head without opening said head, whereby said valve may be operated at will to cut off or regulate the flow of fluid through the head.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is an elevation of a tubing head constructed in accordance with the invention and having portions of tubing connected thereto, Figure 2 is a transverse vertical sectional view of the same, Figure 3 is a view similar to Figure 2, but at right angles thereto, and Figure 4 is a horizontal cross-sectional view, taken on the line 4—4 of Figure 1.

In the drawing, the numeral 10 designates the body or case of the tubing head which is hollow and has a general cylindrical shape. An externally screw-threaded collar 11 is formed at the lower end of the head, for screwing into the upper end of the casing 12 in the usual manner.

At its upper portion, the body is formed with an inclined bowl or seat 13. A tubing hanger 14 is adapted to engage in this bowl, in the usual manner, to form a metal to metal contact and thereby pack off the case. The head 14 has an annular circumferential groove 15 adapted to receive the ends of set screws 16 mounted in the body. These screws fasten the hanger in place and prevent excessive pressure from moving it upward from the bowl 13.

The usual flanged cap 17 is fastened on the case by bolts 18 or otherwise. This cap has an axial threaded nipple 19. It is noted that the screws 16 are employed to retain the hanger in place only when the cap 17 is not in position on the case. The parts which have been described are more or less in use, or form parts of other inventions, and are used herein to set forth a complete structure.

The hanger 14 has a reduced depending shank 20 provided with a further reduced internally screw-threaded collar 21 at its lower end. A section of tubing or any other connection 22 may be screwed into the collar. It is common practice to support a string of tubing in this manner.

The shank is provided with an axial bore 23 and a tapered seat 24 intersecting said bore. A plug valve 25 has a snug turning fit in this seat and is provided with a port 26, having substantially the same diameter as the bore 23, so as not to obstruct said bore when the valve is turned to its open position. The valve is held in its seat by a retaining ring 27 or by any other suitable means.

In order to open the valve from the exterior of the head, a stem 28 is journaled in a plug 29 which is screwed into a tapered opening 30 in one side of the case opposite the nipple 31, which receives the discharge pipe 32. The plug is recessed at 33 to receive a socket 34 on the inner end of the stem, which engages an angular boss 35 on the valve. The stem extends through a stuffing box 36 carried by the plug, and has a wrench grip 37 on its outer end. By applying a suitable tool to the grip 37, the stem may be rotated and the valve opened or closed.

It will be seen that the socket 34 of the stem may be pulled into the recess 33, to withdraw it from the boss 35, and also to remove it from the bore of the case 10. This not only permits the hanger to be moved upwardly but it prevents the socket from interfering with anything which might be passing through the tubing head. Also by withdrawing the socket and stem, the hanger, with the valve therein, may be removed upwardly from the case. By removing the plug 29, access is had to the valve 25, and the opening 30 is made sufficiently large to permit the removal of the ring 27 and the withdrawal of the valve 25 if desired. Removal of the valve in this way however, is seldom, as it is the usual practice to lift the entire hanger from its seat. When the tubing hanger 14 has been landed and fastened, and the cap bolted in place, the stem 28 may be pushed inwardly and rotated so as to engage the boss 35. The stem may then be turned and the valve 25 positioned as desired. By this arrangement, the valve may be manipulated from the exterior of the head, whenever desired, without opening said head. A safety device is provided and also means for controlling the flow of fluid through the head is obtained.

What I claim and desire to secure by Letters Patent, is:

1. A tubing head including, a body, a tubing hanger seated in said body and having a flow passage extending axially entirely therethrough, a valve mounted transversely across the passage in said hanger for opening and closing the passage thereof, and means extending into said body and connected with said valve for operating the same from the exterior of the body.

2. A tubing head including, a body, a tubing hanger seated in said body and having a flow passage extending axially entirely therethrough, a valve mounted in said hanger transversely across said passage for opening and closing the passage thereof, and means extending into said body and connected with said valve for operating the same from the exterior of the body, said means being retractible from the valve and also from the bore of the body.

3. A tubing head including, a case having a seat at its upper portion, a tubing hanger engaging in said seat and packing off the case, said hanger having a flow passage extending therethrough, a valve mounted in the hanger below the pack off and transversely of said passage, and means accessible from the exterior of the case for operating said valve.

4. A tubing head including, a case having a seat at its upper portion, a tubing hanger engaging in said seat and packing off the case, said hanger having a flow passage extending therethrough, a valve mounted in the hanger below the pack off and transversely of said passage, and means extending into said case and connected with said valve for operating the same from the exterior of the case.

5. A tubing head including, a case having a seat at its upper portion, a tubing hanger engaging in said seat and packing off the case, said hanger having a flow passage extending therethrough, a valve mounted in the hanger below the pack off and transversely of said passage, and means extending into said case and connected with said valve for operating the same from the exterior of the case, said means being retractible from the valve and also from the bore of the case.

6. A tubing head including, a case, a tubing hanger seated in said case and having a flow passage extending therethrough, a valve rotatably mounted in the hanger transversely of said passage, a plug mounted in the case, and a valve stem extending through said plug from the exterior of the case and engaging said valve.

7. A tubing head including, a case, a tubing hanger seated in said case and having a flow passage extending therethrough, a valve rotatably mounted in the hanger transversely of said passage, a plug mounted in the case, and a valve stem extending through said plug from the exterior of the case and having a socket engaging the valve, the stem being slidable in the plug, the plug having a recess for receiving the socket when the stem is slid to withdraw it from the valve.

8. A head including, a casing head arranged to be mounted on a casing, a tubing hanger seated in said head and having an axial flow passage extending therethrough, a valve below the top of the head mounted transversely across said hanger for opening and closing the passage thereof, and means accessible through the side of the head and from the exterior thereof for operating said valve.

LAURENCE L. RECTOR.